3,406,226
METHOD OF PRODUCING O,O-DIALKYLDITHIO-PHOSPHORYLFATTYACIDAMIDES

Werner Kochmann, Hans-Günter Seelmann, and Gerda Wetzke, Bitterfeld, Christian Duschek, Leipzig, Frank Frotscher, Halle, Jürgen Müller, Reinhold Springer, Rudolf Liedmann, Peter Schmidt, and Dieter Sass, Bitterfeld, Erwin Armbrüster, Zorbig, Brigitte Triems, Leipzig, and Karl-Heinz Teutschbein, Sandersdorf, Germany, assignors to VEB Elektrochemisches Kombinat Bitterfeld, Bitterfeld, Germany, a corporation of Germany
No Drawing. Filed May 11, 1965, Ser. No. 454,961
11 Claims. (Cl. 260—981)

ABSTRACT OF THE DISCLOSURE

The process for preparing O,O-dialkyldithiophosphorylfattyacidamides which comprises reacting at a temperature between 0° and 125° C., phosphorus pentasulfide, a reaction mixture consisting essentially of an alcohol having the formula $R_1OH$ wherein $R_1$ is an alkyl having 1–4 carbon atoms, and α-halofattyacidamide having the formula $XC(H)(R_2)C(O)N(R_3)R_4$, wherein X is selected from the group consisting of bromine, chlorine, and iodine, $R_2$ is selected from the group consisting of hydrogen and alkyls having 1–4 carbon atoms, and $R_3$ and $R_4$ are each selected from the group consisting of hydrogen, alkyls, having 1 to 4 carbon atoms, and monocyclicaryl.

---

The present invention is directed to a process for producing O,O-dialkyldithiophosphorylfattyacidamides having the formula

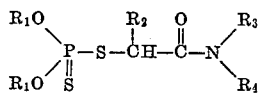

wherein $R_1$ is a straight or branched alkyl having 1 to 4 carbon atoms, $R_2$ is hydrogen or a straight or branched alkyl having 1 to 4 carbon atoms, and $R_3$ and $R_4$ are each hydrogen or a straight or branched alkyl having 1 to 4 carbon atoms, or monocyclic aryls.

These compounds have generally been produced by condensation of salts of O,O-dialkyldithiophosphoryl acids, with halofattyacidamides, said salts being obtained by reaction of phosphorus pentasulfide with the corresponding alcohols. In these methods, using the phosphorus pentasulfide as a reactant for the manufacture of the 3-dialkyldithiophosphoric acid or one of its salts, according to the published literature, the yield of pure product is generally 70%. Substantial amounts of the trialkyl esters of the dithiophosphoric acids are obtained as by-products. To obtain a high yield and a high degree of purity of the desired condensation product during the reaction of the salts with the halofattyacidamides, the by-products associated with the salts must be removed first. In addition, the condensation must take place at low temperatures resulting in very long reaction times.

The use of liquid two-phase systems for this condensation may improve the output, conditioned on prior removal of the by-products which have been formed during the manufacture of the dialkyldithiophosphate acid. The reaction times are the same as those for condensations in a homogeneous phase. In both methods, starting from the pure dialkyldithiophosphoric acids and their salts, respectively, outputs of the desired O,O-dialkyldithiophosphorylfattyacidamides are at most 80%. This is attributed to the effect of the product O,O-dialkylthiophosphoricfattyacidamides acting like an alkyl reactant upon the reactant O,O-dialkyldithiophosphoric acid and its salts. This again leads to the formation of by-products, generally trialkyl esters. In other methods, the O,O-dialkyldithiophosphoric acids are reacted with alkylamines and condensed with monohalofatty acid esters. In a consequent step, the reaction of the O,O-dialkyldithiophosphorylfatty acids is terminated by addition of a strong alkaline compound.

This process requires four process steps, as follows: The manufacture of the O,O-dialkyldithiophosphoric acid, neutralization with an alkylamine, condensation with a halofatty acid ester, and the final step in which the alkylamine which has been liberated by the strong alkaline component reacts with the O,O-dialkyldithiophosphoric acid ester to form the corresponding amide. Each of these steps, except for the first, requires low reaction temperatures and consequent long reaction time. The yield from the first step, based on phosphorus pentasulfide is about 70%, as aforesaid. The condensation with the halogen fatty acid ester results, as is noted in the literature, in obtention of the same yield as the generally conventional condensation with the halofatty acidamides. The fourth step entails additional disadvantages relating to the yield and pureness of the final product. The achievable yield of the desired end-product based on the reactant phosphorus pentasulfide and halofatty acid esters are even less favorable than those of the previously described methods.

It is an object of the present invention to provide a novel economical process for preparing O,O-dialkyldithiophosphorylfattyacidamides. Another object of the invention is to provide the process for preparing said O,O-dialkyldithiophosphorylfattyacidamides in high yield and to prepare products of high purity. Other objects and advantages of the present invention will in part be obvious and will in part appear hereinafter.

The recent invention provides a one-step process for preparing O,O - dialkyldithiophosphorylfattyacidamides having the formula specified hereinbefore, by reacting phosphorus pentasulfide, with alcohol, and a halofattyacidamide. Reaction temperatures are from 0° to 125° C. and preferably at a temperature between 30° and 80° C. The reactant phosphorus pentasulfide can be in the form of a sludge in the reaction mixture, or it may be suspended in a suitable liquid medium. The gaseous products of the reaction are advantageously removed by passing an inert gas through the reaction chamber, or removed with a boiling liquid. It is advantageous to perform this step at a temperature of between 30° to 80° C.

Optimum yields of product, based on the reactant phosphorus pentasulfide is obtained when the halofatty acidamide reactant is added in an amount less than the stoichiometric quantity. The preferred addition of the amide is about 0.6 to 0.9 moles, per mole of the phosphorus pentasulfide.

Illustrative of the halofatty acidamides which are more correctly designated alkyl-substituted haloacetamides having the formula $XC(H)(R_2)C(O)N(CR_3)R_4$, are monochloro-, and monobromofatty acidamides, and the alkyl-, aryl-, and substituted arylamides of the corresponding halofatty acids. Illustrative of such amides are monochloroacetamide; N-methyl-α-bromopropionamide; N-methyl-α-chloroacetamide; N-dibutyl - α - chlorohexionamide; iodoacetamide, N-phenyl; N-diethyl-α-chloroacetamide; bromoacetamide, N-p-chlorophenyl acetamide, N-tolylacetamide, N-ethylphenylacetamide, etc. Illustrative alcohols reactants include methanol, ethanol, n-propanol, i-propanol, and butanol.

The pH value of the final products is correspondingly adjusted to that required, in conventional manner.

The process of the present invention is further illustrated in the following examples:

Example 1

55.5 parts of phosphorus pentasulfide, which is suspended in 65 parts of methylene chloride are reacted with 54 parts N-methyl-α-chloroacetamide, and 32 parts of methanol by boiling at reflux. After two hours the reaction is terminated. The resultant reaction solution contains 85.7 parts O,O-dimethyldithiophosphorylacetamide, N-methyl. This corresponds to a yield of 74.8% based on the phosphorus pentasulfide.

Example 2

55.5 parts of phosphorus pentasulfide, suspended in 50 parts xylol are reacted with 75 parts N-methyl-α-bromoacetamide and 46 parts ethanol at 60° C. hydrogen sulfide and hydrogen bromide are blown out with nitrogen during the reaction. The reaction is terminated after about 90 minutes. The reaction solution contains 96.5 parts of O,O-diethyldithiophosphorylacetamide, N-methyl. This corresponds to a yield of 84.3% based on the N-methylbromoacetamide.

Example 3

55.5 parts of phosphorus pentasulfide, which are suspended in 65 parts of chloroform, are reacted with 81 parts of N-iso-propyl-α-bromoacetamide and 32 parts methanol, by heating at reflux for 70 minutes. For the separation of the solvent, the potassium carbonate solution is adjusted to a pH of 6, and the chloroform is distilled in vacuum from the original phase. One obtains O,O-dimethyldithiophosphorylacetamide, N-isopropyl, as crystalline product in a yield of 89.1% based on the N-iso-propylbromoacetamide.

Example 4

Following the procedure of Example 1 phosphorus pentasulfide suspended in methylene chloride is reacted with α-fluoropropionamide, N-diphenyl, and butanol, to prepare O,O - dibutyldithiophosphoryl(α - methyl)acetamide,N-diphenyl.

Example 5

Following the precedure of Example 1, phosphorus pentasulfide suspended in methylene chloride is reacted with N-dilauryl-α-chlorohexionamide, and methanol, to prepare O,O - dimethyldithiophosphoryl(α - butyl)acetamide, N-dilauryl.

The process of the present invention is accomplished in appreciably shorter reaction times than the known methods. Isolation of intermediate products is not required. Separate manufacture or preparation of pure dithiophosphoric acid and/or its salts, as required in the known methods, is also avoided. Although the reaction is at higher temperatures in the process of the present invention as compared with known processes, and although no intermediate purification is required in this process, the final products are obtained in a highly pure state in high yield.

As many embodiments of this invention may be made without departing from the spirit and scope thereof, it is to be understood that the invention includes all such modifications and variations as come within the scope of the appended claims.

What is claimed is:

1. The process for preparing O,O-dialkyldithiophosphorylfattyacidamides comprising reacting at a temperature between 0° and 125° C., phosphorus pentasulfide, a reaction mixture consisting essentially of an alcohol having the formula $R_1OH$ wherein $R_1$ is an alkyl having 1-4 carbon atoms, and α-halofattyacidamide having the formula $XC(H)(R_2)C(O)N(R_3)R_4$, wherein X is selected from the group consisting of bromine, chlorine, and iodine, $R_2$ is selected from the group consisting of hydrogen and alkyls having 1-4 carbon atoms, and $R_3$ and $R_4$ are each selected from the group consisting of hydrogen, alkyls, having 1 to 4 carbon atoms, and monocyclicaryl.

2. The process of claim 1 wherein gaseous by-products of said reaction are removed by passing inert gas through the reaction vessel.

3. The process of claim 1 wherein said reaction mixture contains an inert solvent.

4. The process of claim 1 wherein gaseous by-products of said reaction are removed by a boiling solvent.

5. The process of claim 3 wherein the reaction is carried out at a temperature between 30° C and 80° C.

6. The process of claim 1 wherein the amount of the amide reactant in the reaction mixture is less than the stoichiometric ratio in respect of phosphorus pentasulfide.

7. The process of claim 5 wherein the amount of the amide reactant in the reaction mixture is less than the stoichiometric ratio in respect of phosphorus pentasulfide.

8. The process claim 7 wherein the amount of amide reactant is between 0.6 and 0.9 mole of amide per half mole of phosphorus pentasulfide.

9. The process of claim 1 for preparing O,O-dimethyldithiophosphorylacetamide, N-methyl, comprising reacting phosphorus pentasulfide, N-methyl - α - chloroacetamide, and methanol, in methylene chloride at reflux.

10. The process of claim 1 for preparting O,O-diethyldithiophosphorylacetamide, N-methyl, comprising reacting phosphorus pentasulfide, N-methyl - α - bromoacetamide, and ethanol, in xylol at 60° C.

11. The process of claim 1 for preparing O,O-dimethyldithiophosphorylacetamide, N-isopropyl, comprising reacting phosphorus pentasulfide, N-isopropyl-α-bromoacetamide, and methanol, in chloroform at reflux.

References Cited

UNITED STATES PATENTS 2,863,902  12/1958  Santay _____ 260—981
2,977,382   3/1961  Millikan _____ 260—943 X CHARLES B. PARKER, *Primary Examiner.*

A. H. SUTTO, *Assistant Examiner.*